United States Patent
Ferriman et al.

(10) Patent No.: US 6,726,571 B2
(45) Date of Patent: Apr. 27, 2004

(54) SNOWMOBILE DRIVESHAFT

(75) Inventors: Larry J. Ferriman, Campbellville (CA); Peter J. Connelly, Barrie (CA); Terry P. Cleland, Brampton (CA)

(73) Assignee: Litens Automotive, Aurora (CA)

( * ) Notice: Subject to any disclaimer, the term of this patent is extended or adjusted under 35 U.S.C. 154(b) by 0 days.

(21) Appl. No.: 10/041,308

(22) Filed: Jan. 8, 2002

(65) Prior Publication Data

US 2002/0091000 A1 Jul. 11, 2002

Related U.S. Application Data

(60) Provisional application No. 60/260,322, filed on Jan. 8, 2001.

(51) Int. Cl.[7] .................................................. F16H 7/06
(52) U.S. Cl. ....................................... 464/182; 464/183
(58) Field of Search ................................ 464/179, 182, 464/183, 49, 181; 180/190, 191, 192, 194, 9.62, 9.64

(56) References Cited

U.S. PATENT DOCUMENTS

| | | | | |
|---|---|---|---|---|
| 2,024,024 A | * | 12/1935 | Carpenter | 432/246 |
| 2,380,952 A | * | 8/1945 | Dewey | 464/182 |
| 3,328,976 A | * | 7/1967 | Shoemaker | 464/177 |
| 4,098,096 A | * | 7/1978 | Chard et al. | 464/89 |
| 4,125,000 A | | 11/1978 | Grob | |
| 4,362,524 A | * | 12/1982 | Lob et al. | 474/88 |
| 4,987,965 A | | 1/1991 | Bourret | |
| 5,660,245 A | | 8/1997 | Marier et al. | |
| 5,667,031 A | | 9/1997 | Karpik | |
| 5,904,217 A | | 5/1999 | Yamamoto et al. | |
| 6,070,683 A | * | 6/2000 | Izumi et al. | 180/190 |

* cited by examiner

Primary Examiner—Lynne H. Browne
Assistant Examiner—Kenneth Thompson
(74) Attorney, Agent, or Firm—Clark Hill PLC

(57) ABSTRACT

A driveshaft for a snowmobile has an elongated hollow tube having a longitudinal extent. The tube has a series of circumferentially spaced longitudinally extending splines. Both ends of the tube each have an insert for journal mounting the tube. At least two sprockets are mounted on the tube in a spaced relation. Each of the sprockets has an inner hub which has an inner circumferential surface contoured to complementarily engage with the tube in a frictional fit.

13 Claims, 1 Drawing Sheet

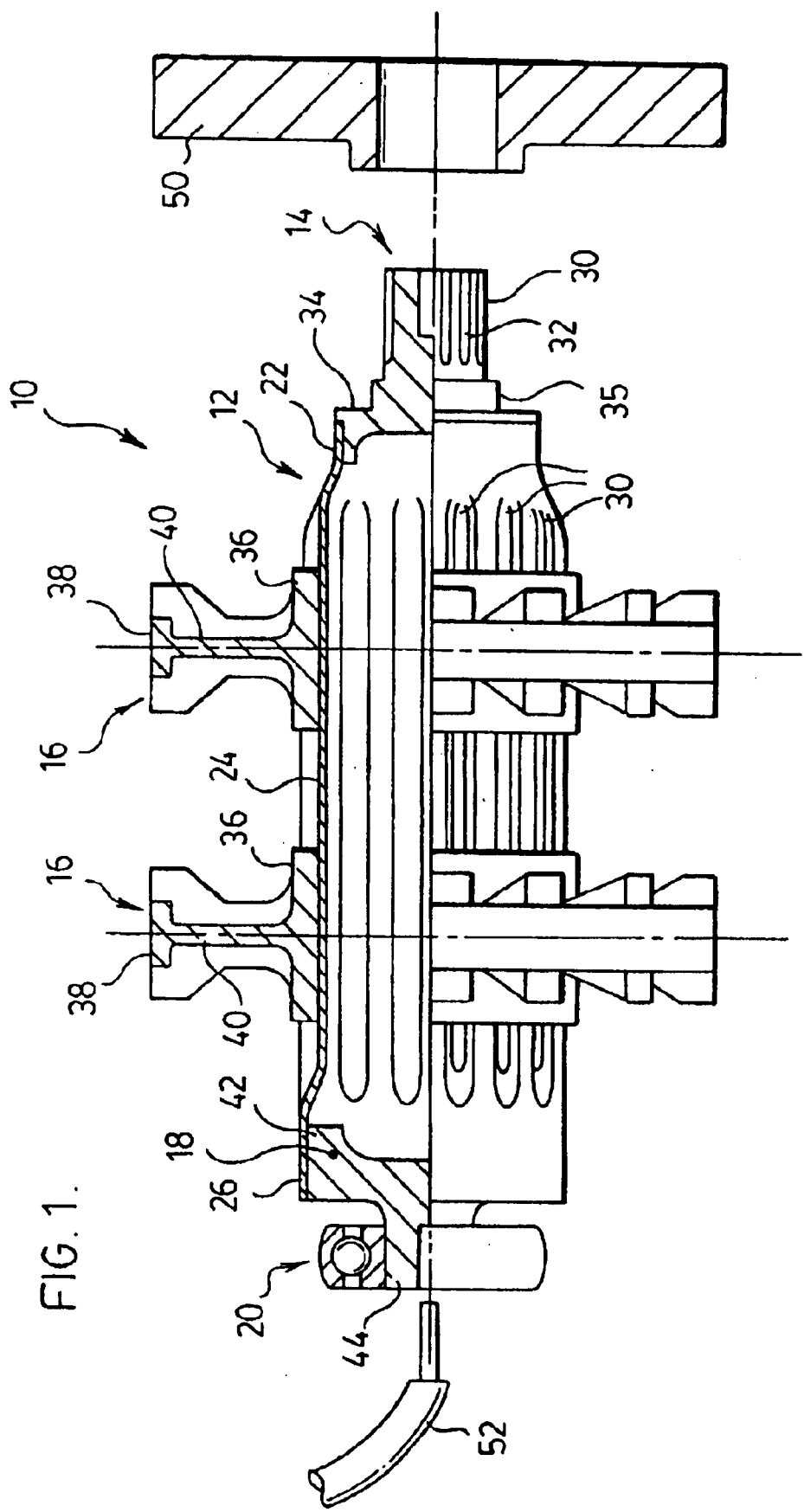

SNOWMOBILE DRIVESHAFT

This application claims the benefit of Provisional application Ser. No. 60/260,322, filed Jan. 8, 2001.

FIELD OF INVENTION

This invention relates to a driveshaft for a snowmobile. In particular, this invention relates to a driveshaft having improved torque transfer characteristics and reduced weight.

BACKGROUND OF INVENTION

Snowmobiles are becoming increasingly popular. Examples of known snowmobiles are described in U.S. Pat. Nos. 4,987,965; 5,660,245; 5,667,031; and 5,904,217. The increasing popularity of snowmobiles increases competition between manufacturers. As a result, snowmobiles manufacturers have been increasing the horsepower of the engines which increases the top speed of the vehicles in order to make the vehicles more marketable.

Typically, a snowmobile has a drive track positioned beneath a frame assembly. A transmission is provided to receive power from the engine. The power is then transferred to the drive track via a rotatably mounted driveshaft. A pair of sprockets is mounted on the driveshaft in order to transfer power to the drive track.

Heretofore, driveshafts for snowmobiles have been made from solid hot rolled steel bar stock. The bar stock has a hexagonal cross section. The sprockets are then mounted on the bar stock and fixed thereon.

Current driveshafts are able to effectively transfer power to the track. However, current driveshafts are also subjected to shock loading especially when the snowmobile travels over rough terrain at high rates of speed. The shock loads cause shaft bending which damages the supporting bearing housings and destroys the shaft to sprocket interface. Current driveshafts are able to sustain at most 50 repetitive shock loads of 1500 ft-lbs before the driveshaft or bearing is permanently deformed or damaged.

Thus, there exist a need in the production of snowmobiles for a driveshaft capable of transferring increasingly amounts of torque, having a reduced weight, while being capable of withstanding severe shock loads without significant deformation.

SUMMARY OF INVENTION

The disadvantages of the prior art may be overcome by providing a hollow driveshaft having a series of longitudinally extending splines which frictionally receives a pair of sprockets.

It is desirable to provide a hollow driveshaft having an increased diameter to improve bending stiffness and reduce stress therein.

According to one aspect of the invention, there is provided a driveshaft for a snowmobile that has an elongated hollow tube having a longitudinal extent. The tube has a series of circumferentially spaced longitudinally extending splines. Both ends of the tube each have an insert for journal mounting the tube. Sprockets are mounted on the tube in a spaced relation. Each of the sprockets has an inner hub which has an inner circumferential surface contoured to complementarily engage with the tube in a frictional fit.

DESCRIPTION OF THE DRAWINGS

In drawing which illustrate embodiment of the present invention,

FIG. 1 is a partial cross section of the preferred embodiment of the present invention.

DESCRIPTION OF THE INVENTION

Referring to FIG. 1, a driveshaft 10 of the present invention is generally illustrated. Driveshaft 10 generally comprises a tube 12, a chain or driving insert 14, a pair of sprockets 16, a speedometer or driven insert 18 and a bearing 20. The driveshaft 10 has a longitudinal extent that corresponds to the transverse direction of the snowmobile in which the driveshaft 10 is installed.

Tube 12 is generally elongate and has a first end 22 having a first diameter, a middle section 24 and a second end 26 having a second diameter. Preferably, first diameter is less than the second diameter.

In the preferred embodiment, tube 12 is a steel tube of high strength low alloy steel, having about a 3 inch outside diameter and a wall thickness of about 0.065 inches. The preferred embodiment surprisingly provides a 400% improvement in bending stiffness, as well as a reduced weight and inertia in comparison with a conventional hex type shaft of the prior art.

The first end 22 is drawn to reduce the diameter of the tube 12 to the first diameter relative to a third diameter of the middle section 24. The reduced diameter enables the sprockets 16 to be mounted on the middle section 24.

Middle section 24 has a series of longitudinally extending parallel splines 30 that are spaced about the circumferential extent of the tube 12. Splines 30 are formed using conventional methods after the first end is drawn to the reduced diameter. Splines 30 extend from the first end 22 presenting an entry for the sprockets 16.

Chain insert 14 has a series of splines 32 and stepped end 34. Stepped end 34 is sized to frictionally engage within the inside diameter of first end 22 and welded thereto. Shoulder 35 can be used to seal the driveshaft 10. Stepped end 34 journal mounts the driveshaft 10. A driving assembly 50 such as a gear is mounted on the chain insert 14 on splines 32. Torque is applied through the driving assembly 50 to the chain insert 14 that transmits the torque to the tube 12.

Sprockets 16 each has an inner hub 36, an outer hub 38 and an interconnecting web 40. The inner hub 36 has an inner circumferential surface having a series of axially extending ribs which complementarily engage with splines 30 in a frictional or interference fit. The outer hub 38 can be of any suitable configuration depending upon the type of track used by the particular manufacturer. Preferably, sprockets 16 are molded ultra high molecular weight polyethelene.

Each of the sprockets 16 is mounted on the tube 12 by inserting the first end 22 of the tube 12 through the hub 36. Once the sprocket 16 is in the desired location along the tube 12, the sprocket 16 is then fixed in place by any suitable methods, including press fitting.

Speedometer insert 18 has a stepped configuration. A portion 42 frictionally fits within the inside diameter of second end 26 of tube 12. A shaft portion 44 is press fitted to the bearing 20 that rotatingly supports the second end 26. The shaft portion 44 is provided with a non-circular bore in the end thereof. The bore receives a cable of a driven assembly 52 that is operably connected with a speedometer.

Preferably, chain insert 14 is forged and machined from steel that is compatible for welding to the tube 12. The speedometer insert 18 is preferably die cast aluminum.

Optionally, shaft portion 44 can be extended allowing other driven assemblies or components to be mounted thereon. For example, a disc can be mounted on the shaft portion 44. The disc cooperates with a set of calipers providing a braking function. In applications requiring torque transfers, the speedometer insert 18 is preferably welded in place, in addition to being press fitted into the second end 26 of the tube 12.

One common failure of prior art hex shafts is damage at the sprocket to shaft interface. Failures commonly occur when the sprocket is subjected to about 400 ft-lbs. However, the preferred embodiment of the present invention has shown to be capable of transferring torques in excess of 1800 ft-lbs.

Although the invention has been described with reference to certain specific embodiments, various modifications thereof will be apparent to those skilled in the art without departing from the scope of the invention as defined by the attached claims.

In particular, the preferred method of forming the splines 32 on the middle section 24 utilizes a mandrel to support the tube 12. The second end 26 has a larger diameter than the first end 22 and the middle section 24. The larger second diameter enables the mandrel to be removed from within the tube 12 after formation of the splines 32. It is now apparent to those skilled in the art that the second end 26 could be further processed, for example by a swaging process, to subsequently reduce the diameter of the second end 26.

What is claimed:

1. A driveshaft for a snowmobile comprising:
    an elongated hollow tube having a longitudinal extent and having a series of circumferentially spaced longitudinally extending splines,
    said tube having a first end having a driving insert for journal mounting said first end, a second end having a driven insert for journal mounting said second end, and a middle section having said splines formed thereon and extending between said first and second end,
    said first end having a first diameter, said second end having a second diameter greater than said first diameter and said middle section having a third diameter greater than said first diameter and less than said second diameter, and
    a pair of sprockets mounted on said tube in a spaced relation, each of said sprockets having an inner hub having an inner circumferential surface contoured to complementarily engage with said tube in a frictional fit.

2. A drive shaft according to claim 1 wherein each of said sprockets is press fitted onto said splines of said tube.

3. A drive shaft according to claim 2 wherein said tube is a high strength low alloy steel.

4. A drive shaft according to claim 3 wherein said sprockets are a molded ultra high molecular weight polyethylene.

5. A drive shaft according to claim 4 wherein said tube has an outside diameter of about 3 inches.

6. A drive shaft according to claim 5 wherein said tube has a wall thickness of about 0.065 inches.

7. A drive shaft according to claim 1 wherein said driving insert is configured to receive a driving assembly.

8. A drive shaft according to claim 7 wherein said driving insert is press fitted and welded to said tube.

9. A drive shaft according to claim 7 wherein said driven insert is configured to operative engage a driven assembly.

10. A drive shaft according to claim 9 wherein said driven insert is press fitted to said tube.

11. A drive shaft according to claim 9 wherein said driving insert is press fitted and welded to said tube.

12. A drive shaft according to claim 9 wherein said driven assembly is a speedometer.

13. A drive shaft according to claim 9 wherein said driven assembly is a disc of a disc brake assembly.

* * * * *